July 31, 1951  E. SCHUTZ  2,562,396
SAFETY DEVICE FOR SAWS
Filed March 15, 1947  4 Sheets-Sheet 2

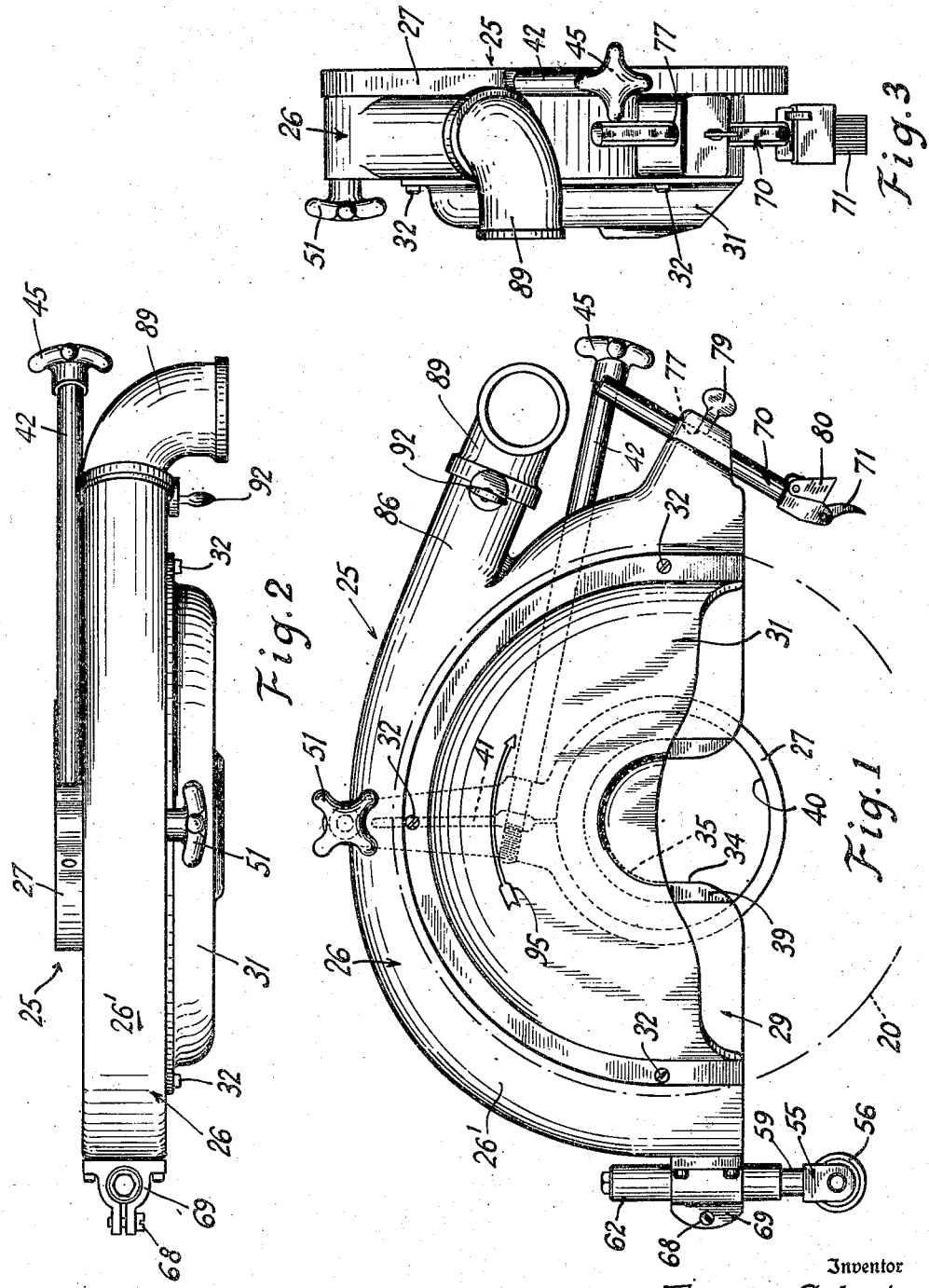

Inventor
Ewald Schutz
By Ramsey, Kent & Chisholm
Attorneys

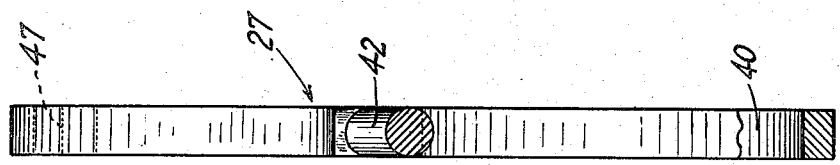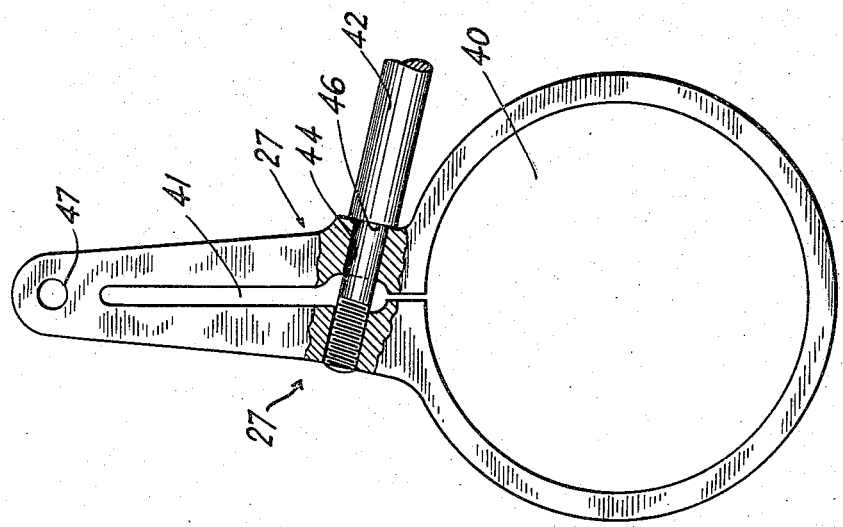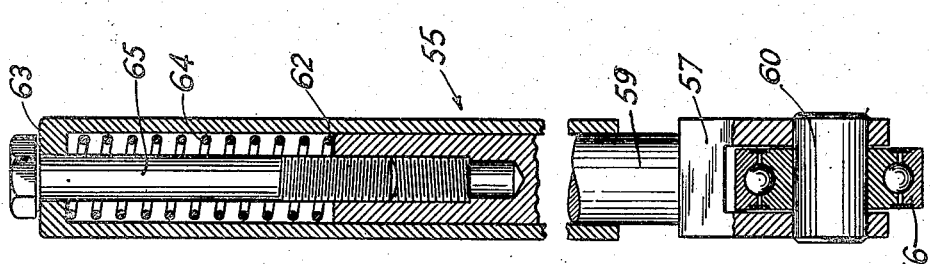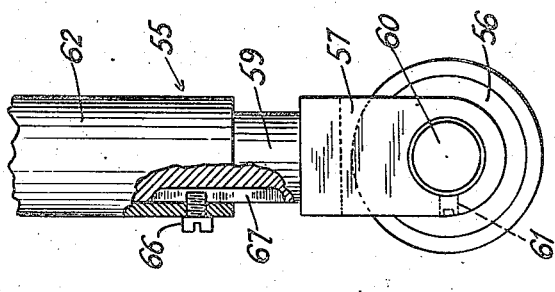

Inventor
Ewald Schutz
By Ramsey, Kent & Chisholm
Attorneys

UNITED STATES PATENT OFFICE 2,562,396

SAFETY DEVICE FOR SAWS

Ewald Schutz, Lancaster, Pa., assignor, by mesne assignments, to De Walt Inc., Lancaster, Pa., a corporation of Pennsylvania Application March 15, 1947, Serial No. 734,944

1 Claim. (Cl. 143—159)

This invention relates to power driven saws, and more particularly to guards or housing for surrounding a circular saw blade.

Power driven circular saws of the type in which the saw disc is mounted on an arm above the worktable are conventionally provided with a saw guard consisting of a housing surrounding the upper and middle portions of the circular blade. Such a guard leaves the bottom portion of the blade uncovered to provide clearance for the passage of pieces of work against the blade for the sawing operation. A guard of this type is used regardless of whether the saw is held stationary and the work progressed along a saw table as in ripping (sawing parallel to the grain), or the work is held stationary and the saw progressed as in crosscutting (cutting in a direction across the grain of the wood).

The guard serves principally to safeguard the machine operator against injury from contact with the saw, as well as injury from small pieces of wood that might be thrown off from the saw during the sawing operation, or by pieces of the saw blade in the event that the blade should break. Further, these guards are often of closed, imperforate construction so as to prevent the sawdust formed by the cutting operation from being thrown in the air in the vicinity of the saw, where it often becomes a health and fire hazard. Means are often provided for collecting sawdust from the guard and directing it into a bin or pile adjacent the saw.

In usual rotary saw construction, a circular saw blade is mounted on a shaft or arbor projecting from an electric motor housing. The guard is usually bolted or otherwise secured to the end of the housing so as to support it in position about the saw blade.

In the form shown, the present invention contemplates providing a solid or imperforate saw guard of the type above described. This guard is mounted upon the motor housing by an improved mount, the guard being easily and quickly detachable by means of a single easily accessible hand screw so as to permit rapid change or replacement of the saw or other circular cutter.

The guard mounting consists of a bracket which is radially contractable about a circular portion of the motor housing end by means of a hand screw. The bracket projects upwardly for a short distance and terminates in a section provided with a threaded aperture for receiving a second hand screw provided on the top portion of the guard.

The guard is provided with a wide upwardly-projecting slot in the lower central edge of its inner wall which terminates in a semicircular portion, the width of the slot being such that the edges thereof will lie in a circumferential groove formed in a cylindrical portion of the motor housing. When the guard is so positioned on the motor housing, it is in correct position relative to the saw blade, and may be screwed to the mounting bracket by the second hand screw above described.

The engagment of the guard with the circumferential groove of the housing supports and positions the guard against all but upward or rotary motion within the groove of the motor housing. The bracket serves to prevent upward movement of the guard so as to prevent it from becoming disengaged from the housing and at the same time prevents rotary movement of the guard relative to the housing. In addition, the bracket serves to steady the upper portion of the guard and prevent objectionable vibration thereof.

The clearance between the work and the guard on the work-entering side of the saw when ripping may be adjusted by jointly rotating the guard and mounting bracket on the motor housing and reclamping it in adjusted position.

A work hold-down is provided on an end of the guard to prevent the saw blade from carrying the work upwardly from the saw table when ripping. This work hold-down consists essentially of a roller mounted on a bracket secured to the guard.

An anti-kickback is mounted on the opposite end of the guard. This device is used only when ripping and consists of several pivotally-mounted rigid fingers mounted on a short bracket, the fingers permitting the work to progress forwardly past the saw but preventing any backward movement of the work.

An object of the present invention is to provide means for rigidly mounting a saw guard for a circular saw in a manner so that the guard may be quickly and easily adjusted to vary its position.

A further object of the invention is to provide an adjustable saw guard that is readily removable from or replaceable on the motor housing without disturbing the adjustment of the guard.

Further objects of the invention are to provide a cast aluminum saw guard that may be easily and securely attached to the motor housing of a saw, and to provide a saw guard which can be used without change with either an ordinary saw blade or with a dado head.

A further object of the invention is to provide improved means for mounting a saw guard upon a saw so as to minimize vibration of the guard.

A still further object of the invention is to provide improved means mounted on the saw guard for holding the work on the saw table and preventing the saw from kicking the work out in a direction opposite to the direction of feed.

Further objects, and objects relating to details and economies of construction and operation, will more definitely appear from the detailed description to follow.

My invention is clearly defined in the appended claim. In the claim, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is a side elevation of a saw guard assembly constructed in accordance with the present invention, a portion of the saw blade being indicated by dot-and-dash lines.

Fig. 2 is a top plan view of the saw guard assembly shown in Fig. 1.

Fig. 3 is a front end elevation of the guard assembly shown in Figs. 1 and 2.

Fig. 7 is a side elevation of the guard mounting bracket, a portion of the bracket being broken away to show details of construction, and a portion of the hand screw being omitted.

Fig. 8 is an edge elevation of the bracket shown in Fig. 7, a portion of the bracket being broken away and a portion of the screw being omitted for clarity of illustration.

Fig. 9 is a fragmentary side elevation of the work hold-down, a portion being broken away to show details of construction.

Fig. 10 is a vertical section of the work hold-down shown in Fig. 9, certain parts being shown partly or wholly in elevation.

The present invention is of particular applicability to circular power driven saws of the general type shown in U. S. Patent 2,329,345, of September 14, 1943, issued to Wallace W. Gardner, in which a circular saw blade is mounted on a saw arbor which turns within a motor housing. The saw, including the motor and housing, is adjustably mounted upon a movable saw carriage. The saw is usually driven by an electric motor.

In such a saw, a saw table is mounted immediately below the saw blade. Wood or other material is positioned upon the saw table for the sawing operation, in some instances the saw blade and carriage being moved against stationary work, and in other instances the work being moved and the saw carriage remaining stationary, in order to feed work into the saw blade for cutting.

Saw blades having different sizes and shapes of teeth as well as several parallel saw blades, and other rotary cutting attachments may be substituted on the saw arbor of such a saw in order to crosscut, rip, dado, plough, rabbet, groove, or perform other well-known woodworking operations.

Figure 4:
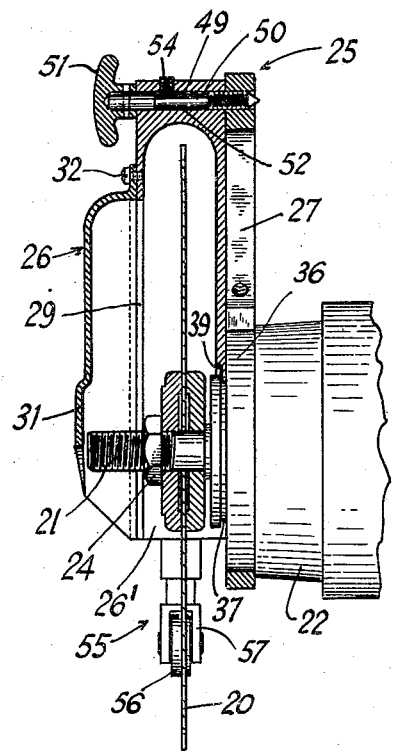
Fig. 4 is a vertical section of a portion of a saw, taken through the saw arbor, the saw being equipped with the saw guard above shown. Portions of the arbor, motor housing, and guard assembly are shown in elevation.

Referring particularly to Figs. 1 and 4 of the drawings, a circular saw blade 20 is mounted upon a rotatable saw arbor 21, the saw arbor projecting from a motor housing 22. The saw arbor 21 constitutes a motor shaft extension, the arbor being turned by an electric motor, of which the housing 22 constitutes a part.

The saw blade 20 is secured by an arbor nut 24 in a well-known manner for rotation with the arbor 21. The assembly of saw blade 20 and arbor 21 rotatably mounted and driven by a motor within the motor housing 22, is conventional and well-known in the art.

A saw guard assembly 25 is mounted on the motor housing 22 adjacent the saw blade 20. This guard assembly consists of a metal housing or guard 26 which is adapted to surround the upper and middle portions of the saw blade 20 and a guard mounting bracket 27 for securing the guard 26 to the motor housing.

The guard 26 includes a cast metal housing 26' shaped as indicated in Figs. 1 and 2 so as to define a hollow generally semicylindrical shell positionable about the upper and midportions of the saw blade 20. The guard member 26' has its outer wall cut away in part to form a wide semicircular opening 29 providing the necessary clearance for mounting a wide circular cutter such as a dado head 30 shown in Fig. 5 on the arbor 21. The guard 26 is extended over the dado head 30 by a hollow-formed cover plate 31 of general semicircular outline adapted to fit over the semicircular opening 29 of the guard member 26'. The cover plate 31 is held in position on the guard member 26' by screws 32 uniting the two parts.

The central portion of the inner wall of the guard member 26' is cut away to form an upwardly-directed slot 34 having parallel walls terminating in a semicircular slot-end portion 35. The slot 34 cooperates with the motor housing 22 in mounting the guard 26 thereon.

Figure 6:
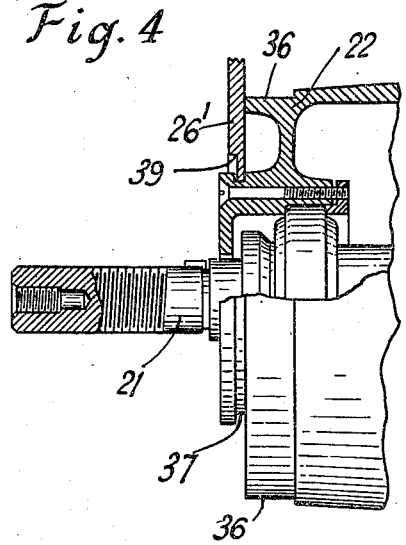
Fig. 6 is a detail view, partly in elevation and partly in vertical section taken through the saw arbor, of the end of the motor housing and saw arbor, and showing a portion of the saw guard, the guard mounting bracket being omitted.

Referring to Figs. 4 and 6, the motor housing 22 is provided with a cylindrical-shaped bracket seat 36 which is concentric with the saw arbor 21 and adjacent the saw blade 20. A circular groove 37 of rectangular cross section is formed in the concentric end of the motor housing 22, next to the seat 36, lying between this seat and the saw blade 20. The groove 37 is also concentric with the saw arbor 21.

When the guard 26 is in supported position on the motor housing 22, the edges of the guard surrounding slot 34 thereof lie within the groove 37 of the housing, the semicircular portion 35 of the slot resting in the top portion of this groove as shown in Figs. 4 and 6. This guard is preferably formed of cast aluminum. The aluminum casting, which need not be machined generally to close tolerances, is machined about the margin 39 of the slot 34 so as to provide a definite thickness of material about the slot for firm engagement without excessive clearance in the groove 37.

The guard mounting bracket 27 is comprised of a flat bracket of the form indicated in Fig. 7.

This bracket has a large circular opening 40 in its lower end of suitable size to closely surround the seat 36 of the motor housing 22. The bracket 27 has a slot 41 extending upwardly from the circular opening 40. This bracket is preferably formed of malleable iron so as to possess necessary strength and flexibility for the purpose intended.

A hand screw 42 has an end thereof passing through a bore 44 formed in the bracket on one side of the slot 41 and threadedly engaged in the bracket on the other side of the slot, the hand screw being located on the bracket a short distance above the opening 40. This hand extends for a considerable distance to one side of the bracket 27 and terminates in an end portion 45 of convenient shape for operation of the screw without use of tools. The hand screw 42 has a flat shoulder 46 thereon which, upon tightening the hand screw, engages the surface of the bracket 27 surrounding the bore 44 thereof and draws the bracket together so as to narrow the slot 41 and circumferentially contract the opening 40. Upon turning the hand screw in the opposite direction, the resiliency of the bracket causes the opening 40 to circumferentially expand to its previous size. This circumferentially-contractable opening provides a means for firmly clamping the bracket 27 in position on the seat 36 of the motor housing.

Bracket 27 is provided in its upper end with a threaded bore 47, the axis of this bore being parallel with that of the opening 40. When the guard is in assembled position on the motor housing 22, the bore 47 is threadedly engaged by a hand screw 49 (see Fig. 4) mounted in a bore 50 located in the top portion of the guard 26. The hand screw 49 is provided with a head portion 51 shaped for convenient operation without the use of tools, the hand screw serving to bolt the guard 26 to the bracket 27. The hand screw 49 is preferably provided with a reduced shank portion 52 which, in cooperation with a screw 54 projecting into the bore 50 without clamping the hand screw, serves to retain the hand screw within the bore 50 at all times so as to render this screw captive and prevent its loss.

A material hold-down 55 is provided on the left-hand end of the guard 26, as shown in Fig. 1. The hold-down, which is shown in detail in Figs. 9 and 10, consists of a roller 56 rotatably mounted in the bifurcated end 57 of a shank 59. The roller 56 preferably consists of a ball bearing assembly mounted upon a horizontal pin 60 passing through the end 57 of the shank. A set screw 61 holds the pin 60 in position.

The shank 59 is cylindrical and contained within a sleeve 62, this sleeve having a closed upper end 63. The shank 59 is biased downwardly relative to the sleeve 62 by a helical compression spring 64 positioned between the end 63 of the sleeve and the upper end of the shank. A bolt 65 is threadedly engaged in the upper portion of the shank 59 and projects through the closed end 63 of the sleeve, the head of the bolt being engageable with the upper side of the sleeve end 63 so as to limit downward movement of the shank 59. A screw 66, projecting into the interior of the sleeve 62, is contained within a longitudinal slot 67 formed in the shank 59 so as to prevent rotation of the shank relative to the sleeve.

The hold-down 55 is mounted in a clamp 69 secured to an end of the guard 26, this clamp engaging the outer cylindrical surface of the sleeve 62. Upon loosening the clamp 69 by means of a clamp screw 68, the hold-down may be raised or lowered.

Figure 11:
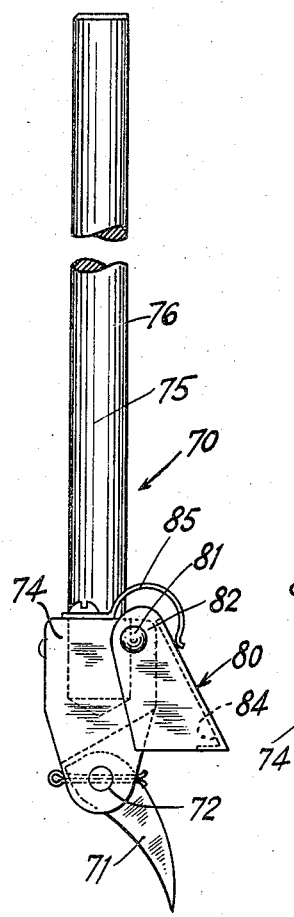
Fig. 11 is a side elevation of the anti-kickback.
Figure 12:
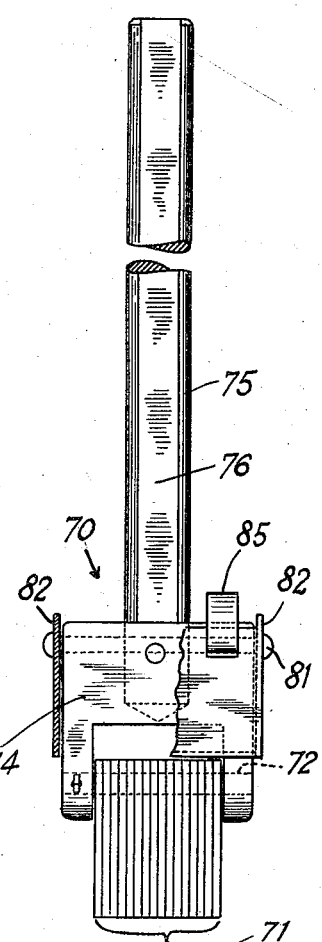
Fig. 12 is a front elevation of the device shown in Fig. 11, a portion of the finger retainer being broken away to show details of construction.

An anti-kickback 70 is mounted at the right end of the guard 26, as viewed in Fig. 1. This device, which is shown in detail in Figs. 11, 12 and 13, includes a plurality of rigid flat fingers 71 which are pivotally mounted on a horizontal pin 72 supported in the bifurcated end 74 of a shank 75. The fingers 71 are free to oscillate independently on the pin 72 and normally take a downwardly-directed position, as indicated in Fig. 11, due to the force of gravity.

The shank 75 is cylindrical except where cut away to form a flat side 76 extending for the length of the shank in a surface parallel to the pin 72. The anti-kickback 70 is mounted in a bore 77 formed in the end of the guard 26, the direction of the bore being as indicated in Figs. 1 and 3 so as to somewhat incline the shank 75 of the device when in mounted position. A thumb screw 79, threadedly engaged in the guard 26, may be projected into the bore 77 thereof to engage the flat side 76 and hold the shank 75 of the anti-kickback in adjusted position.

Figure 13:
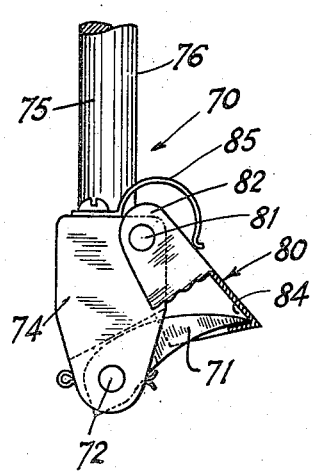
Fig. 13 is a fragmentary view similar to Fig. 11, the fingers of the device being shown in inoperative position and a portion of the finger retainer being broken away.

A finger retainer 80 is pivotally mounted on the bifurcated end 74 by a horizontal rivet 81 passing through ears 82, 82 of the retainer and parallel to the pin 72. The finger retainer 80 is provided with a pocket or housing 84 extending for the width of the retainer and formed by the walls thereof. This pocket is adapted to receive the ends of the fingers 71 and retain them in raised inactive position, as shown in Fig. 13. A flat curved spring 85 mounted on the bifurcated end 74 biases the retainer 80 counterclockwise, as viewed in Figs. 11 and 13, so as to maintain the retainer in engagement with the fingers 71 when they are in raised position.

The guard 26 is adapted to collect the sawdust and chips formed from the cutting of wood and direct them away from the cutting area while at the same time preventing them from flying freely through the air where they would become a health and fire hazard. Accordingly, the guard 26 is shaped to form a circular conduit 86 extending tangentially from the interior of the guard and in the direction of saw rotation. The conduit 86 terminates in a flange or bead 87 (see Fig. 14). A dust spout 89, which is formed as a swiveled 90° elbow extension of the conduit 86, serves to direct the stream of dust and chips from the cutting operation in any desired direction. The spout 89 is positioned so as to direct the stream of dust and chips free of the saw and in a direction away from the operator. This spout may be used to direct such flow into a bin or other container, not shown.

Figure 14:
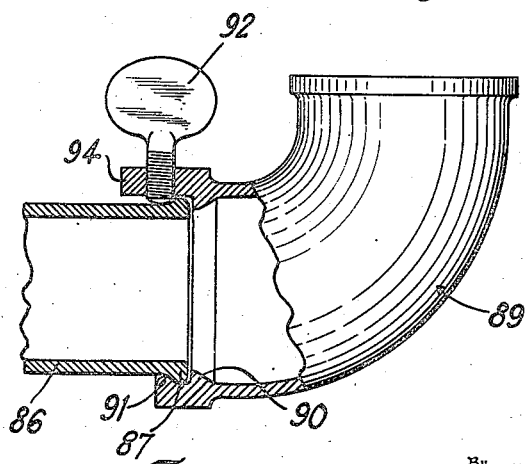
Fig. 14 is a side elevation of the dust spout, a portion of the spout being shown in section together with the adjacent portion of the guard.
Figure 15:
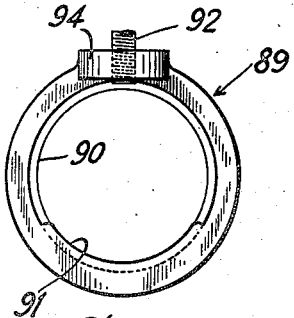
Fig. 15 is an end elevation of the guard connecting portion of the dust spout.

The spout 89 is provided with a circular inwardly-directed flange or bead 90 within the spout and a terminal inwardly-directed flange 91 extending for only a portion of the distance around the interior of the spout, as shown in Fig. 15. Opposite the flange 91, a thumb screw 92 is provided in an extension 94 of the spout. The spout may be entered over the bead 87 of the conduit 86 and the thumb screw projected towards the flange 91 so as to maintain the spout in position, as shown in Fig. 14. The spout 89 may be revolved to any position on the conduit 86 and maintained in that position by tightening the thumb screw 92 against the conduit.

In the mounting of the guard assembly 25 on the saw, the guard mounting bracket 27 is entered over the end of the motor housing 22 and positioned on the bracket seat 36, the hand screw 42 being in loosened position. This bracket must be positioned on the housing before the saw blade 20 is secured to the saw arbor 21. After the bracket 27 is so positioned, it is clamped onto the seat 36 by tightening the hand screw, the bracket pointing generally upwardly. After the bracket 27 has been initially positioned on the housing 22, it is not ordinarily necessary to remove this bracket for any purpose.

The saw blade 20, dado head 30, or other rotary cutter may be secured or interchanged on the saw arbor 21, the guard 26 being entirely removed from the saw, thus permitting complete access to the saw and facilitating the attachment of the rotary cutter.

After the cutter has been secured on the saw arbor 21, the guard 26 is lowered vertically over the cutter, the margin 39 of the slot 34 entering within the groove 37 of the motor housing 22. The guard 26 is lowered until the slot margin 39 lies within the groove 37 for approximately 180°, at which time the guard will be supported against lateral movement in any but an upward direction.

Figure 5:
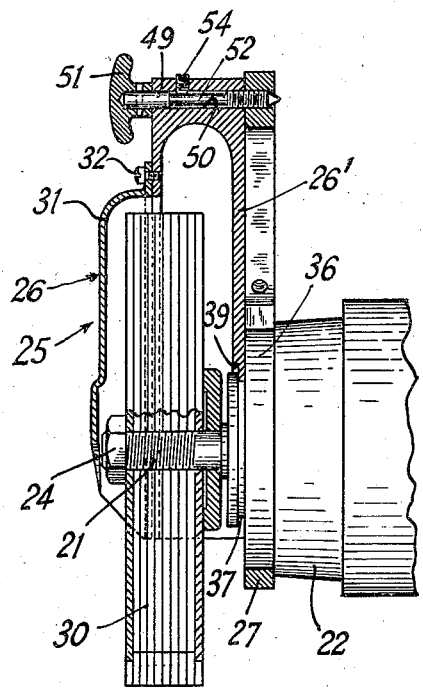
Fig. 5 is a view similar to Fig. 4, a dado head being substituted for the saw blade of Fig. 4.

The guard 26 is then rotated on the motor housing 22 until the bore 50 at the top of the guard is in alignment with the threaded bore 47 of the bracket 27. The hand screw 49 can then be engaged with the bore 47 so as to secure the guard against the side of the bracket, as shown in Figs. 4 and 5.

The bracket 27 serves to prevent upward displacement or radial movement of the guard 26 on the motor housing 22. By this means of attaching the guard to the housing, two widely-separated points of support for the guard are utilized, and the guard rests against the bracket for most of its height, thereby reducing to a minimum vibration of the guard. This method of mounting also provides for ready adjustment or removal of the guard, it being necessary to loosen only the hand screw 49 in order to remove the guard entirely for changing circular cutters or for other purposes.

The material hold-down 55 and anti-kickback 70 which are normally continuously maintained in mounted position on the guard 26 are only used for ripping (cutting parallel to the grain of the wood). In ripping, the material is fed along a worktable in a direction opposed to the revolution of the saw blade, the saw carriage remaining stationary. In Fig. 1 this would be in a direction from left to right, the saw rotating as indicated by an arrow 95 cast in the surface of the cover plate 31. In ripping, the saw has a tendency to pick up the material as it rotates, as well as to kick the material back against the direction of the feed if some obstruction to the path of the saw teeth is encountered. The material hold-down 55, which is mounted on the work-entering side of the saw, counteracts any tendency for the revolving saw blade 20 to pick up the work, the spring 64 forcing the roller 56 downwardly against the material being sawed.

To engage the roller 56 with the top surface of the material, as well as to prevent sawdust from being thrown towards the saw operator by the upwardly-rotating side of the blade, the guard 26, as viewed in Fig. 1, is so rotated on the housing 22 as to lessen the space between the left-hand lower edge of the guard and the top surface of the material being sawed. This adjustment is accomplished by loosening the hand screw 42 of the bracket 27 and rotating the bracket and guard together on the housing 22 to the desired position, after which the hand screw is retightened.

As above mentioned, the anti-kickback is used only for ripping. After the guard 26 is adjusted, as above described, the thumb screw 79 is loosened and the anti-kickback 70 lowered until the bifurcated end thereof is close enough to the top surface of the material being sawed, after which the thumb screw is retightened. The finger retainer 80 is then oscillated counterclockwise, as viewed in Fig. 13, to release the fingers 71 which will drop to the position shown in Fig. 1. As the material passes beneath the anti-kickback 70, the finger 71 will be oscillated counterclockwise, as viewed in Figs. 1 and 11, the sawed material sliding beneath the fingers. If the sawing continues normally, the material will continue to slide beneath the fingers 71, these fingers not materially impeding the passage of the material. However, if the saw blade 20 catches the material being sawed and commences to drive it against the direction of feed, or to the left as viewed in Fig. 1, the fingers 71 will immediately dig into the top surface of the material so as to prevent any further backward motion, thus protecting the saw operator against injury.

I claim:

In a power driven saw, a motor housing, a shaft projecting from said housing, a portion of said housing being concentric with said shaft, a rotary cutter mounted on said shaft, a guard surrounding the upper and mid-portions of said cutter, a mounting bracket clamped about said concentric housing portion, said mounting bracket being oscillatable about said housing portion, securing means to clamp said mounting bracket against oscillation, a circular groove on said concentric housing portion, a margin on said guard complementary to said groove and adapted to be engaged therein, and means to secure said guard to said bracket at a point on said guard distant from said complementary margin whereby said guard is supported and positioned by said bracket.

EWALD SCHUTZ.

REFERENCES CITED

The following references are of record in the file of this patent:

UNITED STATES PATENTS

| Number | Name | Date |
|---|---|---|
| 285,407 | Gretschel | Sept. 25, 1883 |
| 901,889 | Cummings | Oct. 20, 1908 |
| 995,323 | Cato | June 13, 1911 |
| 1,089,901 | Carson | Mar. 10, 1914 |
| 1,122,486 | Eisler | Dec. 29, 1914 |
| 1,368,773 | Voss et al. | Feb. 15, 1921 |
| 1,381,612 | Anderson | June 14, 1921 |
| 1,563,317 | Avel | Dec. 1, 1925 |
| 1,709,239 | Wiebe | Apr. 16, 1929 |
| 1,733,532 | Elliot | Oct. 29, 1929 |
| 1,815,037 | De Walt | July 21, 1931 |
| 1,830,151 | Wilderson | Nov. 3, 1931 |
| 1,858,459 | Ramey | May 17, 1932 |
| 1,888,679 | Knapp | Nov. 22, 1932 |
| 2,257,459 | Gardner | Sept. 30, 1941 |
| 2,422,943 | Mooradian | June 24, 1947 |